US009756646B2

(12) United States Patent
Shin et al.

(10) Patent No.: US 9,756,646 B2
(45) Date of Patent: Sep. 5, 2017

(54) D2D COMMUNICATIONS SYSTEM AND ALLOCATION METHOD OF RESOURCES AND POWER USING THE SAME

(71) Applicant: SOONGSIL UNIVERSITY RESEARCH CONSORTIUM TECHNO-PARK, Seoul (KR)

(72) Inventors: Oh-Soon Shin, Seoul (KR); Gil Mo Kang, Seoul (KR); Hyeon Min Kim, Seoul (KR)

(73) Assignee: SOONGSIL UNIVERSITY RESEARCH CONSORTIUM TECHNO- PARK, Seoul (KR)

( * ) Notice: Subject to any disclaimer, the term of this patent is extended or adjusted under 35 U.S.C. 154(b) by 253 days.

(21) Appl. No.: 14/682,125

(22) Filed: Apr. 9, 2015

(65) Prior Publication Data
US 2015/0305046 A1  Oct. 22, 2015

(30) Foreign Application Priority Data

Apr. 18, 2014  (KR) ........................ 10-2014-0046878
Mar. 23, 2015  (KR) ........................ 10-2015-0039991

(51) Int. Cl.
*H04W 72/08* (2009.01)
*H04W 52/24* (2009.01)
(Continued)

(52) U.S. Cl.
CPC .........  *H04W 72/08* (2013.01); *H04W 52/241* (2013.01); *H04W 52/243* (2013.01);
(Continued)

(58) Field of Classification Search
CPC ............ H04W 52/241; H04W 52/243; H04W 52/383; H04W 72/08; H04W 76/023
(Continued)

(56) References Cited

U.S. PATENT DOCUMENTS

2010/0093364 A1* 4/2010 Ribeiro ............... H04W 72/082
                                                        455/452.2
2010/0261469 A1* 10/2010 Ribeiro ................. H04W 99/00
                                                        455/423
(Continued)

FOREIGN PATENT DOCUMENTS

KR  10-2008-0028347       3/2008
KR     101371181 B1 *     3/2014  .......... H04W 72/087

*Primary Examiner* — Jeffrey M Rutkowski
*Assistant Examiner* — Shah Rahman
(74) *Attorney, Agent, or Firm* — Revolution IP, PLLC

(57) ABSTRACT

A base station included in the D2D communication system: a shared resource allocation unit configured to select a resource block having highest performance in D2D communication from a plurality of resource blocks occupied by a plurality of cellular terminals and to set the shared resource block to be shared by a corresponding D2D terminal; an exclusive resource allocation unit configured to select at least one other D2D terminal with which to share an exclusive resource block occupied by the corresponding D2D terminal for the D2D communication and to set the exclusive resource block to be shared by the at least one other D2D terminal; and a power allocation unit configured to create a virtual resource block by matching the shared resource block and the exclusive resource block and to control powers allocated to the shared resource block and the exclusive resource block included in the virtual resource block.

10 Claims, 5 Drawing Sheets

(51) Int. Cl.
*H04W 52/38* (2009.01)
*H04W 76/02* (2009.01)
*H04W 72/06* (2009.01)

(52) U.S. Cl.
CPC .......... *H04W 52/383* (2013.01); *H04W 72/06* (2013.01); *H04W 76/023* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2014/0247779 | A1* | 9/2014 | Wei | H04W 72/087 370/329 |
| 2015/0065154 | A1* | 3/2015 | Van Phan | H04W 72/042 455/450 |
| 2015/0163751 | A1* | 6/2015 | Guo | H04W 52/24 455/522 |
| 2015/0351089 | A1* | 12/2015 | Li | H04W 72/082 455/426.1 |
| 2015/0358803 | A1* | 12/2015 | Lee | H04W 76/023 455/434 |
| 2016/0037322 | A1* | 2/2016 | Nguyen | H04W 8/005 370/329 |
| 2016/0330699 | A1* | 11/2016 | Yang | H04W 52/241 |
| 2016/0381690 | A1* | 12/2016 | Kim | H04W 72/08 370/329 |
| 2017/0027010 | A1* | 1/2017 | Gattami | H04L 1/20 |

* cited by examiner

[FIG. 1]
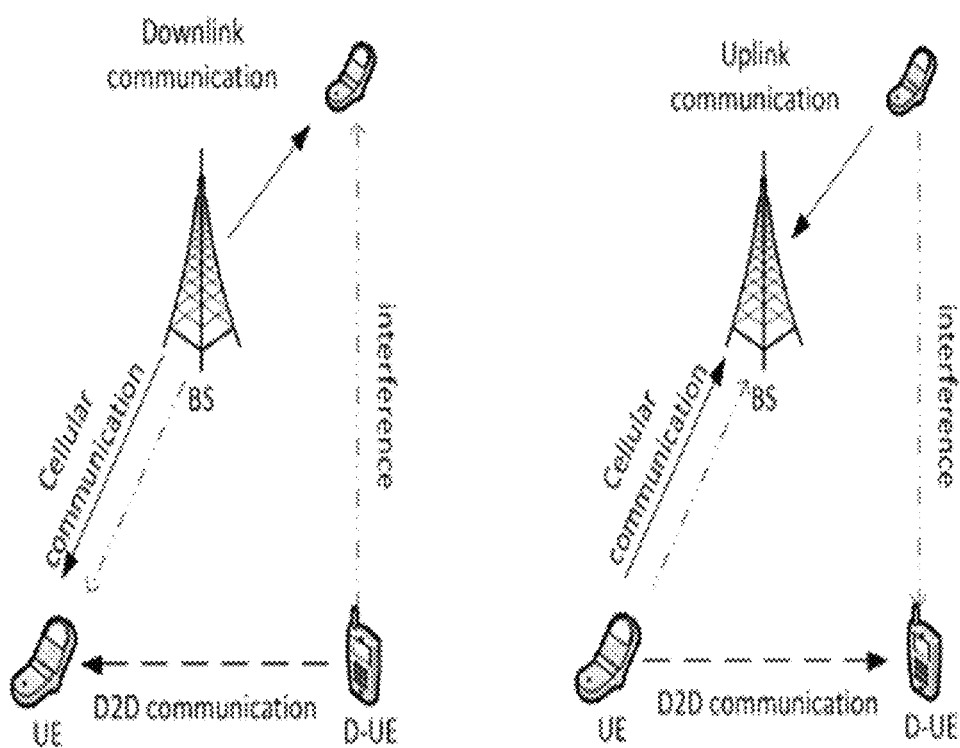

[FIG. 2]
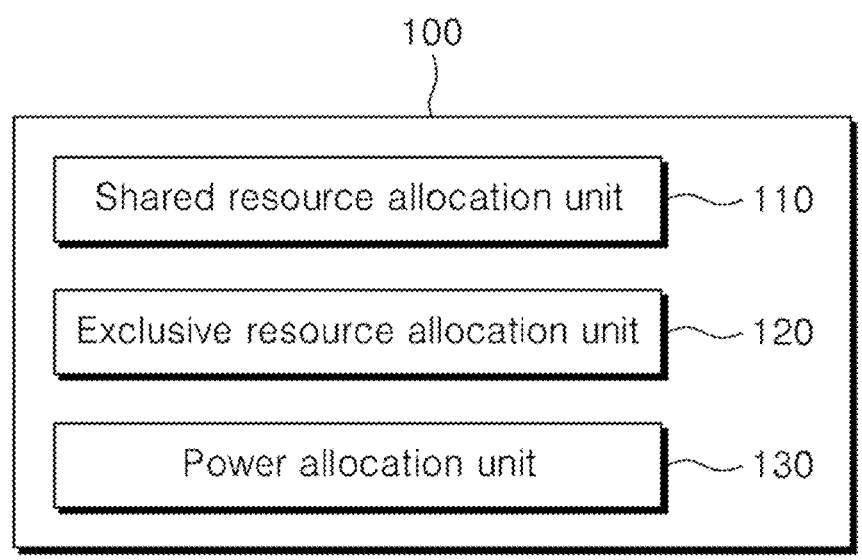

[FIG. 3]
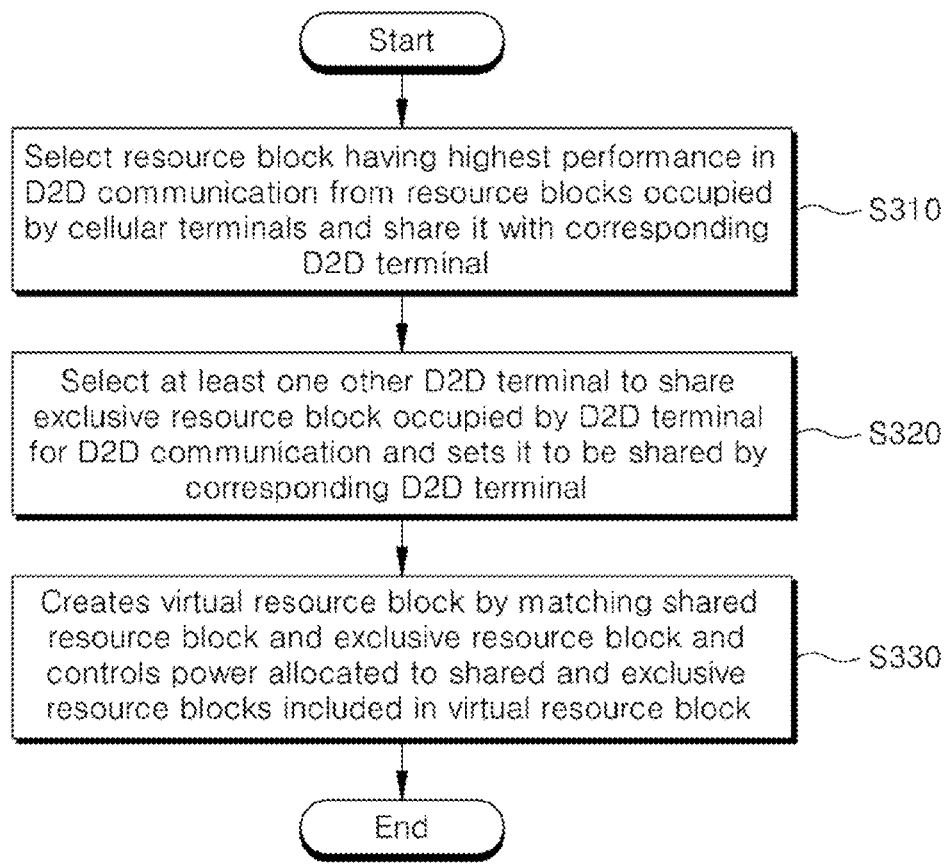

[FIG. 4]
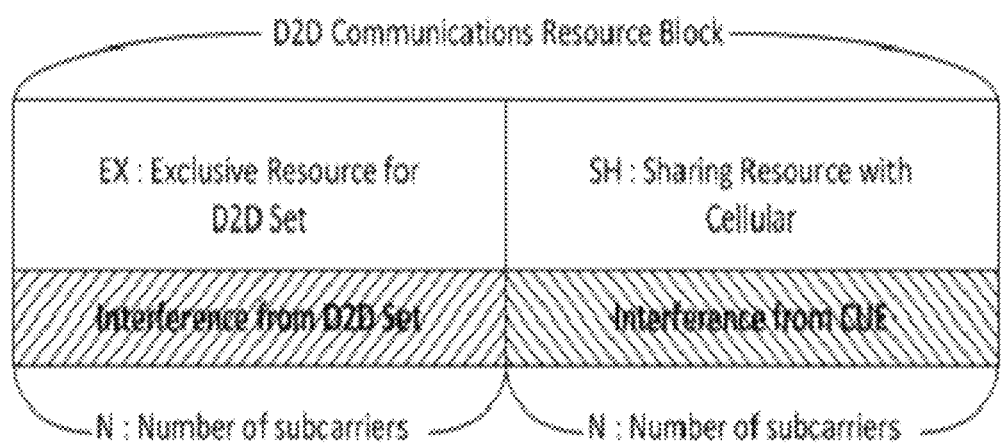

[FIG. 5]
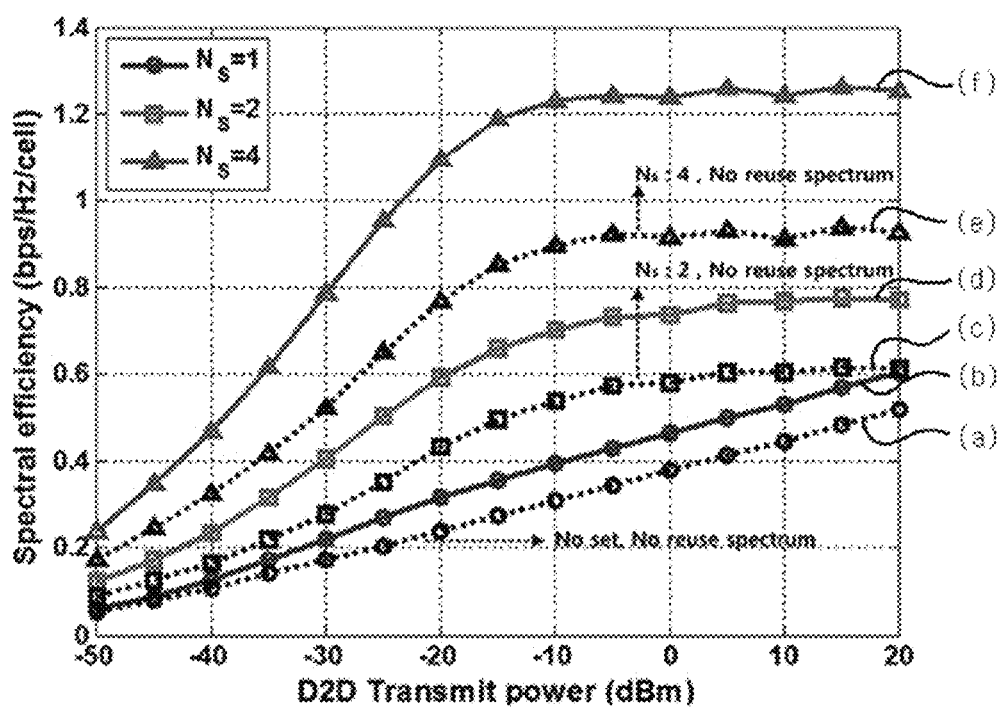

D2D COMMUNICATIONS SYSTEM AND ALLOCATION METHOD OF RESOURCES AND POWER USING THE SAME

CROSS-REFERENCE TO RELATED APPLICATIONS

This application claims the priority of Korean Patent Application No. 10-2014-0046878 filed on Apr. 18, 2014 and Korean Patent Application No. 10-2015-0039991 filed on Mar. 23, 2015, in the Korean Intellectual Property Office, the disclosure of which is incorporated herein by reference.

BACKGROUND OF THE INVENTION (a) Field of the Invention

The present invention relates to a device-to-device (D2D) communication system and a method for allocating resources and power using the same, and more particularly, to a D2D communication system and a method for allocating D2D resources and power to maximize spectral efficiency using the same in a cellular system for supporting D2D communication.

(b) Description of the Related Art

Recently, as various services using a wireless mobile communication system are provided, data traffic has drastically increased, and a device-to-device (D2D) communication in a cellular system is under research and development (R&D) and standardization to solve such a problem.

The D2D communication allows adjacent terminals to directly communicate each other without passing through infrastructure such as a base station and the like, thereby enabling a new service based on proximity and improving spectral efficiency of the cellular system at the same time.

Therefore, a D2D link needs to share an existing cellular frequency resource with a cellular link so as to improve spectral efficiency.

However, while the D2D link share the existing cellular frequency resource with the cellular link to improve the spectral efficiency, interference there between may occur.

As such, as a research is being carried out to allow the D2D communication and the cellular communication to use the same communication band, appropriate resource allocation and power distribution of the D2D communication has become a critical issue to reduce mutual interference between the D2D communication and the cellular communication.

In the most typical approach to allocating resources in the cellular link and the D2D link, the base station collects information about channel statuses of respective links and mutually interfered links, and then performs resource allocation based on the collected information.

Such an approach has a merit of correctly measuring influence of interference, but it is not desirable because an optimization issue such as increased complexity in measuring and collecting channel information, signaling overhead increase, and a complex resource allocation algorithm should be addressed.

In addition, in the case of a time-varying channel that varies at a very high speed, performance degradation may be a serious problem since it is difficult to obtain correct channel information.

Another aspect that is not considered in conventional resource allocation schemes is to determine which resources are effective to share with.

For example, it may be difficult to share a D2D link of a cellular user's resource near a cell edge because of severe interference.

Accordingly, the resource allocation algorithm needs to be designed such that it preferentially shares a resource with less interference.

Further, the existing cellular communication and the D2D communication have been considered as separate systems with respect to each other, so resource and power allocations for the cellular communication and the D2D communication are independently performed.

The background art of the present invention is disclosed in the Korean Patent Laid-Open Publication No. 2008-0028347 (laid-open on Mar. 31, 2008).

SUMMARY OF THE INVENTION

The present invention has been made in an effort to provide a device-to-device (D2D) communication system for allocating D2D resources and power to maximize spectral efficiency and a method using the same in a cellular system for supporting the D2D communication.

An exemplary embodiment of the present invention provides a D2D communication system for sharing a cellular resource. A base station included in the D2D communication system includes: a shared resource allocation unit configured to select a resource block having highest performance in D2D communication from a plurality of resource blocks occupied by a plurality of cellular terminals and to set the shared resource block to be shared by a corresponding D2D terminal; an exclusive resource allocation unit configured to select at least one other D2D terminal with which to share an exclusive resource block occupied by the corresponding D2D terminal for the D2D communication and to set the exclusive resource block to be shared by the at least one other D2D terminal; and a power allocation unit configured to create a virtual resource block by matching the shared resource block and the exclusive resource block and to control powers allocated to the shared resource block and the exclusive resource block included in the virtual resource block.

The shared resource allocation unit may select a resource block having highest D2D performance and set the resource block as a shared resource block according to the following equation:

$$m^* = \arg\max_{m} \log\left(1 + \frac{\sum_{n=1}^{N} |h_{sh(m,n)}^{d2d}|^2 \Delta_{(m)}^{d2d}}{\sum_{n=1}^{N} |h_{sh(m,n)}^{cd}|^2 P_{sh(m)}^{cue} + N\sigma^2}\right),$$

where $m^*$ represents the selected resource block, m represents the number of cellular, $h_{sh(m,n)}^{d2d}$ represents a channel corresponding to the shared resource block for the D2D communication, $\Delta_{(m)}^{d2d}$ represents a transmission power threshold of the D2D terminal, $h_{sh(m,n)}^{cd}$ represents a channel corresponding to the resource block between the cellular terminal and the base station, $p_{sh(m)}^{cue}$ represents a cellular communication power in the shared resource block, and N represents the number of subcarriers, and $\sigma$ represents a noise power.

The exclusive resource allocation unit may select the D2D terminal with which to share the exclusive resource block according to the following equation:

$$s^* = \arg\max_s \delta_s \log\left(1 + \frac{\sum_{n=1}^{N} |h_{ex(s,n)}^{d2d}|^2 P_{ex(s)}^{d2d}}{\sum_{\substack{i=1 \\ i \neq s}}^{N_s} |h_{ex(i,n)}^{i2d}|^2 P_{ex(i)}^{i2d} + N\sigma^2}\right),$$

where s* represents a selected D2D group, S represents a plurality of detected candidate D2D terminal groups, $h_{ex(s,n)}^{d2d}$ represents a channel corresponding to the exclusive resource block for the D2D communication, $p_{ex(s)}^{d2d}$ represents a D2D communication power in the exclusive resource block, $h_{ex(i,n)}^{i2d}$ represents a channel corresponding to the D2D terminal with which to share the exclusive resource block, $p_{ex(i)}^{i2d}$ represents a communication power corresponding to the D2D terminal with which to share the exclusive resource block, N represents the number of subcarriers, and σ a noise power.

Wherein a condition of $$\sum_{n=1}^{N} p_{ex(s,n)} + p_{sh(s,n)} \leq P_{max}, \, p_{(ex,sh)(s,n)} \geq 0 \text{ and } \sum_{n=1}^{N} p_{sh(s,n)} \leq \Delta_s$$

is satisfied, the power allocation unit may calculate a maximum power of the set D2D group for the shared resource block and the exclusive resource block included in the virtual resource block according to the following equation:

$$\text{Maximize} \sum_{s=1}^{N_s} \sum_{n=1}^{N} \log_2\left(1 + \frac{|h_{ex(s,n)}^{d2d}|^2 P_{ex(s,n)}}{\sum_{\substack{i=1 \\ i \neq s}}^{N_s} |h_{ex(i,n)}^{i2d}|^2 P_{ex(i,n)} + \sigma^2}\right) +$$

$$\log_2\left(1 + \frac{|h_{sh(s,n)}^{d2d}|^2 P_{sh(s,n)}}{|h_{sh(s,n)}^{cd}|^2 P_{sh(s,n)}^{cue} + \sigma^2}\right),$$

where $\Delta_s$ represents the maximum transmission power of a plurality of detected D2D groups, $h_{ex(s,n)}^{d2d}$ represents a channel corresponding to the exclusive resource block of the D2D communication terminal, $p_{ex(s,n)}$ represents an initial power allocated to the exclusive resource block, $h_{ex(i,n)}^{i2d}$ represents a channel corresponding to an exclusive resource block of an i-th candidate D2D communication terminal, $p_{ex(i,n)}$ represents power allocated to the exclusive resource block of the i-th candidate D2D communication terminal, $h_{sh(s,n)}^{d2d}$ represents a channel corresponding to the shared resource block between the corresponding D2D communication terminals, $p_{sh(s,n)}$ represents an initial power allocated to the shared resource block, $h_{sh(s,n)}^{cd}$ represents a channel corresponding to the shared resource block between the cellular terminal and the corresponding D2D communication terminal, $p_{sh(s,n)}^{cue}$ represents a cellular power allocated to the shared resource block, and σ represents a noise power.

The power allocation unit may calculate power to be allocated to the shared resource block included in the virtual resource block and allocate the calculated power according to the following equation:

$$P_{sh(s,n)}^* = \left(\frac{1}{\ln 2}\frac{1}{\lambda_s + \mu_s} - \frac{|h_{sh(s,n)}^{cd}|^2 p_{sh(s,n)}^{cue} + \sigma^2}{|h_{sh(s,n)}^{d2d}|^2}\right)^+,$$

where $P^*_{sh(s,n)}$ represents power to be allocated to the shared resource block, $P^*_{ex(s,n)}$ represents power to be allocated to the exclusive resource block, and represent lagrange multipliers, $h_{sh(s,n)}^{cd}$ represents a channel corresponding to the shared resource block between the cellular terminal and the corresponding D2D communication terminal, $p_{sh(s,n)}^{cue}$ represents a cellular power allocated to the shared resource block, $h_{sh(s,n)}^{d2d}$ represents a channel corresponding to the shared resource block of the corresponding D2D communication terminal, σ represents a noise power, and $(x)^+$=min$(0,x)$.

The power allocation unit may calculate power to be allocated to the exclusive resource block included in the virtual resource block and allocate the calculated power according to the following equation:

$$P_{ex(s,n)}^* = \left(\frac{1}{\ln 2}\frac{1}{\sum_{\substack{i=1 \\ i \neq s}}^{N_{s^*}} C_{ex(i,n)}|h_{ex(i,n)}^{i2d}|^2 + \lambda_s} - \frac{\sum_{\substack{i=1 \\ i \neq s}}^{N_{s^*}} |h_{ex(i,n)}^{i2d}|^2 p_{ex(i)}^{i2d} + \sigma^2}{|h_{ex(s,n)}^{d2d}|^2}\right)^+,$$

where $P^*_{ex(s,n)}$ represents power allocated to the exclusive resource block, $C_{ex(i,n)}$ represents $$\frac{\partial R_{(i,n)}}{\partial I_{d(i,n)}},$$

$h_{ex(i,n)}^{i2d}$ represents a channel corresponding to an exclusive resource block of an i-th candidate D2D communication terminal, $p_{ex(i)}^{i2d}$ represents power of the i-th candidate D2D terminal in the exclusive resource block, $h_{ex(s,n)}^{d2d}$ represents a channel corresponding to the exclusive resource block of the corresponding D2D communication terminal, and $(x)^+$=min$(0,x)$.

According to another exemplary embodiment of the present invention, a method of allocating resources and power by a base station included in a D2D communication system for sharing a cellular resource, includes: selecting a resource block having highest performance in D2D communication from a plurality of resource blocks and setting the resource block as a shared resource block to be shared by a corresponding D2D terminal; selecting at least one other D2D terminal with which to share an exclusive resource block occupied by the corresponding D2D terminal for the D2D communication and setting the exclusive resource block to be shared by the at least one other D2D terminal; and creating a virtual resource block by matching the shared resource block and the exclusive resource block and then controlling powers allocated to the exclusive resource block included in the virtual resource block.

According to the present invention, in the D2D system using the cellular resources, spectral efficiency of the D2D system can be improved through the resource allocation for sharing the resource of the cellular user as well as the exclusive resource allocation for the D2D user.

In addition, when sharing the cellular resource, the D2D transmission power is limited to ensure performance of the cellular user, a plurality of D2D users form a group for the exclusive resource and reuse the same resource spatially, thereby improving spectrum efficiency and performance of the entire cells.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a drawing for describing an interference scenario in a downlink and an uplink according to an exemplary embodiment of the present invention.

FIG. 2 is a schematic diagram of a base station included in a device-to-device (D2D) communication system according to the exemplary embodiment of the present invention.

FIG. 3 is a flowchart for illustrating a method for allocating resources and power according to an exemplary embodiment of the present invention.

FIG. 4 is a drawing for illustrating a virtual resource block for D2D communication according to the exemplary embodiment of the present invention.

FIG. 5 is a drawing for illustrating spectral efficiency associated with D2D transmission powers according to the exemplary embodiment of the present invention.

DETAILED DESCRIPTION OF THE EMBODIMENTS

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

The present invention will be described more fully hereinafter with reference to the accompanying drawings, in which exemplary embodiments of the invention are shown.

FIG. 1 is a drawing for describing an interference scenario in a downlink and an uplink according to an exemplary embodiment of the present invention.

A base station BS of a wireless mobile communication system may be a base station of a device-to-device (D2D) terminal D-UE (Direct-UE) for enabling D2D communication with a user terminal UE or a small cell and a pico cell.

A method of the user terminal UE communicating via the base station BS is represented by a cellular communication, and a method of the user terminal UE directly communicating with the D2D terminal D-UE without via the base station BS is represent by a D2D communication.

The user terminal UE receives a signal from the base station and the D2D terminal through the downlink.

In this case, interference from the base station, in addition to interference from the D2D terminal to other user terminals using a corresponding resource, exists in the user terminal UE.

The user terminal UE transmits a signal to the base station and the D2D terminal through the uplink.

In this case, there are interference received by the base station and interference coming from other user terminal to be received by the D2D terminal.

Among the interferences in the respective links, a user terminal may use a channel corresponding to deep shadowing or deep fading to exchange channel status information (CSI) with the base station, thereby reducing the interference in the downlink from the base station.

In addition, performance degradation due to the interference can be easily overcome in the downlink since transmission power is greater in the downlink than in the uplink, whereas in the uplink, maximum transmission power of the user terminal is small and thus transmission power is greatly limited by the interference that the base station receives.

Accordingly, in the exemplary embodiment of the present invention, resource and power allocations are proposed to achieve a maximum data rate of the uplink in the overall D2D communication system.

Next, referring to FIG. 2, a base station included in a D2D communication system according to the exemplary embodiment of the present invention will be described.

FIG. 2 is a schematic diagram of the base station included in the D2D communication system according to the exemplary embodiment of the present invention.

The base station 100 included in the D2D communication system includes a shared resource allocation unit 110, an exclusive resource allocation unit 120, and a power allocation unit 130.

The shared resource allocation unit 110 selects a resource block having highest performance in the D2D communication from a plurality of resource blocks occupied by a plurality of cellular terminals, and sets it as a shared resource block to be shared by the corresponding D2D terminal.

The shared resource allocation unit 110 selects the most efficient shared resource block for the corresponding D2D terminal using an equation of a transmission power threshold of the D2D terminal through an average signal-to-noise ratio (SNR) of a cellular user.

The exclusive resource allocation unit 120 allows the D2D communication terminal to exclusively use some of cellular resources.

Further, for the D2D communication, the exclusive resource allocation unit 120 selects and sets up an optimal D2D terminal or a D2D communication group such that the exclusive resource block occupied by the corresponding D2D communication terminal can be opportunistically reused by at least one other D2D communication terminal.

The power allocation unit 130 creates a virtual resource block by matching the shared resource block and the exclusive resource block that are selected by the shared resource allocation unit 110 and the exclusive resource allocation unit 120, and controls powers allocated to the shared resource block and the exclusive resource block that are included in the virtual resource block.

The power allocation unit 130 collects power of each of the D2D terminals in real-time as an initial value, and calculates and controls power of each of the resource blocks.

In this case, in response to the power values and the interferences collected in real-time, the power allocation unit 130 controls the power of the virtual resource block of each D2D terminal such that an overall performance of the D2D communication is optimal.

That is, while maintaining a total amount of power, the power allocation unit 130 adjusts and controls the powers of the shared resource block and the exclusive resource block.

A method for allocating resources and power will now be described with reference to FIGS. 3 and 4.

FIG. 3 is a flowchart for illustrating a method for allocating resources and power according to an exemplary embodiment of the present invention, and FIG. 4 is a drawing for illustrating a virtual resource block for D2D communication according to the exemplary embodiment of the present invention.

First, a base station 100 included in a D2D communication system selects a resource block having highest performance in a D2D communication from a plurality of resource blocks occupied by a plurality of cellular terminals, and sets it as a shared resource block to be shared by a corresponding D2D terminal (S310).

Since the base station 100 should guarantee quality of service (QoS) of a user, an average SNR of cellular users is used to calculate a transmission power threshold of the D2D terminal, and a D2D terminal may be selected according to Equation 1.

The base station 100 calculates to select the resource block having the highest performance for the corresponding D2D terminal from the plurality of resource blocks using the following Equation 1.

$$m^* = \underset{m}{\mathrm{argmax}} \log \left( 1 + \frac{\sum_{n=1}^{N} |h_{sh(m,n)}^{d2d}|^2 \Delta_{(m)}^{d2d}}{\sum_{n=1}^{N} |h_{sh(m,n)}^{cd}|^2 p_{sh(m)}^{cue} + N\sigma^2} \right)$$ [Equation 1]

Herein, m* represents the selected resource block, m represents the number of cellular, $h_{sh(m,n)}^{d2d}$ represents a channel corresponding to a shared resource block for the D2D communication, $\Delta_{(m)}^{d2d}$ represents a transmission power threshold of the D2D terminal, $h_{sh(m,n)}^{cd}$ represents a channel corresponding to the resource block between the cellular terminal and the base station, $p_{sh(m)}^{cue}$ represents a cellular communication power in the shared resource block, N represents the number of subcarriers, and σ represents a noise power.

Next, the base station 100 selects at least one other D2D terminal with which to share the exclusive resource block occupied by the corresponding D2D terminal for the D2D communication, and sets it to be shared by the corresponding D2D terminal (S320).

The base station 100 selects the at least one other D2D terminal with which to share the exclusive resource block occupied by the corresponding D2D terminal according to the following Equation 2.

$$s^* = \underset{s}{\mathrm{argmax}} \delta_s \log \left( 1 + \frac{\sum_{n=1}^{N} |h_{ex(s,n)}^{d2d}|^2 p_{ex(s)}^{d2d}}{\sum_{\substack{i=1 \\ i \neq s}}^{N_{s^*}} |h_{ex(i,n)}^{i2d}|^2 p_{ex(i)}^{i2d} + N\sigma^2} \right)$$ [Equation 2]

Herein, s* represents a selected D2D group, S represents a plurality of candidate D2D terminal groups, $h_{ex(s,n)}^{d2d}$ represents a channel corresponding to the exclusive resource block for the D2D communication, represents a D2D communication power in the exclusive resource block, represents a channel corresponding to the D2D terminal with which to share the exclusive resource block, $p_{ex(i)}^{i2d}$ represents a communication power corresponding to the D2D terminal with which to share the exclusive resource block, N represents the number of subcarriers, and σ represents a noise power.

Finally, the base station 100 creates a virtual resource block by matching the shared resource block and the exclusive resource block, and then controls powers allocated to the shared resource block and the exclusive resource block that are included in the virtual resource block (S330).

FIG. 4 illustrates a D2D communications resource block, that is, the virtual resource block in which the shared resource block and the exclusive resource block are matched.

That is, in the exemplary embodiment of the present invention, FIG. 4 illustrates the virtual resource block in which the exclusive resource for D2D set (EX) for the D2D communication and the shared resource with cellular (SH) used by both the cellular communication and the D2D communication are matched.

As such, the respective resource blocks in the virtual resource block are influenced by different interferences.

That is, there are interference from the other D2D communication terminal communicating in the exclusive resource EX (interference from D2D set) and interference from the base station for cellular communication in the shared resource SH (interference from CUE).

In addition, the exclusive resource EX and the shared resource SH include the number of subcarriers (N) that is used to modulate a carrier.

As such, the base station 100 performs optimal power allocation for each of the resource blocks included in the virtual resource block so as to achieve a maximum data rate of an overall D2D communication system.

If the shared resource block and the exclusive resource block included in the virtual resource block satisfy a condition of $$\sum_{n=1}^{N} p_{ex(s,n)} + p_{sh(s,n)} \leq P_{max}, \; p_{(ex,sh)(s,n)} \geq 0 \text{ and } \sum_{n=1}^{N} p_{sh(s,n)} \leq \Delta_s,$$

the base station 100 may calculate a maximum power of the predetermined D2D group set by the following Equation 3.

$$\text{Maximize} \sum_{s=1}^{N_{s^*}} \sum_{n=1}^{N} \log_2 \left( 1 + \frac{|h_{ex(s,n)}^{d2d}|^2 p_{ex(s,n)}}{\sum_{\substack{i=1 \\ i \neq s}}^{N_{s^*}} |h_{ex(i,n)}^{d2d}|^2 p_{ex(i,n)} + \sigma^2} \right) +$$ [Equation 3]

$$\log_2 \left( 1 + \frac{|h_{sh(s,n)}^{d2d}|^2 p_{sh(s,n)}}{|h_{sh(s,n)}^{cd}|^2 p_{sh(s,n)}^{cue} + \sigma^2} \right)$$

Herein, $\Delta_s$ represents a maximum transmission power of a plurality of detected D2D groups, $h_{ex(s,n)}^{d2d}$ represents a channel corresponding to the exclusive resource block of the D2D communication terminal, $p_{ex(s,n)}$ represents an initial power allocated to the exclusive resource block, $h_{ex(i,n)}^{i2d}$ represents a channel corresponding to an exclusive resource block of an i-th candidate D2D communication terminal, $p_{ex(i,n)}$ represents power allocated to an exclusive resource block of an i-th candidate D2D communication terminal, $h_{sh(s,n)}^{d2d}$ represents a channel corresponding to the shared resource block between the corresponding D2D communication terminals, $p_{sh(s,n)}$ represents an initial power allocated to the shared resource block, $h_{sh(s,n)}^{cd}$ represents a channel corresponding to the shared resource block between the cellular terminal and the corresponding D2D communication terminal, $p_{sh(s,n)}^{cue}$ represents a cellular power allocated to the shared resource block, and σ represents a noise power.

The base station 100 calculates Equation 3 using a lagrangian function and a karush-kuhn-tucker (KKT) condition like Equation 4.

$$L(p_{ex}, p_{sh}, \lambda_s, u_s) = \sum_{s=1}\sum_{n=1} R(p_{ex}, p_{sh}) - \quad \text{[Equation 4]}$$

$$\lambda_s(p_{ex(s,n)}^{d2d} + p_{sh(s,n)}^{d2d}) - u_s p_{sh(s,n)}^{d2d} + \sum_{s=1}^{N_s^*}\lambda_s P_{max} + \sum_{s=1}^{N_s^*} u_s \Delta_s$$

$$\frac{\partial L}{\partial p_{ex}} = \frac{\partial R(p_{ex}, p_{sh})}{\partial p_{ex}} + \frac{\partial \sum_{\substack{z=1\\z\neq s}}^{N_s^*} R(p_{ex}, p_{sh})}{\partial p_{ex}} - \lambda_s$$

$$\frac{\partial L}{\partial p_{sh}} = \frac{\partial R(p_{ex}, p_{sh})}{\partial p_{sh}} - (\lambda_s + u_s) = 0,$$

$$\lambda_s \left(\sum_{n=1}^{N}(p_{ex(s,n)} + p_{sh(s,n)}) - P_{max}\right) = 0.$$

$$u_s\left(\sum_{n=1}^{N} p_{sh(s,n)} - \Delta_s\right) = 0$$

Next, the base station 100 calculates power to be allocated to the shared resource block included in the virtual resource block using Equation 5 from the karush-kuhn-tucker (KKT) condition like Equation 4.

$$P_{sh(s,n)}^* = \left(\frac{1}{\ln 2}\frac{1}{\lambda_s + u_s} - \frac{|h_{sh(s,n)}^{cd}|^2 p_{sh(s,n)}^{cue} + \sigma^2}{|h_{sh(s,n)}^{d2d}|^2}\right)^+ \quad \text{[Equation 5]}$$

Herein, $P^*_{sh(s,n)}$ represents power to be allocated to the shared resource block, $P^*_{ex(s,n)}$ represents power to be allocated to the exclusive resource block, $\lambda_s$ and $u_s$ represent lagrange multipliers, $h_{sh(s,n)}^{cd}$ represents a channel corresponding to the shared resource block between the cellular terminal and the corresponding D2D communication terminal, $p_{sh(s,n)}^{cue}$ represents a cellular power allocated to the shared resource block, $h_{sh(s,n)}^{d2d}$ represents a channel corresponding to the shared resource block of the corresponding D2D communication terminal, σ represents a noise power, and $(x)^+ \equiv \min(0,x)$.

In addition, the base station 100 calculates power to be allocated to the exclusive resource block included in the virtual resource block using Equation 6 from the karush-kuhn-tucker (KKT) condition like Equation 4.

$$P_{ex(s,n)}^* = \quad \text{[Equation 6]}$$

$$\left(\frac{1}{\ln 2}\frac{1}{\sum_{\substack{i=1\\i\neq s}}^{N_s^*} C_{ex(i,n)}|h_{ex(i,n)}^{i2d}|^2 + \lambda_s} - \frac{\sum_{\substack{i=1\\i\neq s}}^{N_s^*}|h_{ex(i,n)}^{i2d}|^2 + p_{ex(i)}^{i2d} + \sigma^2}{|h_{ex(s,n)}^{d2d}|^2}\right)^+$$

Herein, $P^*_{ex(s,n)}$ represents power allocated to the exclusive resource block, $C_{ex(i,n)}$ represents $$\frac{\partial R_{(i,n)}}{\partial I_{d(i,n)}},$$

$h_{ex(i,n)}^{i2d}$ represents a channel corresponding to an exclusive resource block of an i-th candidate D2D communication terminal, $p_{ex(i)}^{i2d}$ represents power of the i-th candidate D2D terminal in the exclusive resource block, $h_{ex(s,n)}^{d2d}$ represents a channel corresponding to the exclusive resource block of the corresponding D2D communication terminal, and $(x)^+ \equiv \min(0,x)$.

In this case, $C_{ex(i,n)}$ represents a performance sum of the group differentiated by power as in $$\sum_{\substack{i=1\\i\neq s}}^{N_s^*} C_{ex(i,n)}|h_{ex(i,n)}^{i2d}|^2 = \frac{\partial \sum_{\substack{z=1\\z\neq s}}^{N_s^*} R(p_{ex}, p_{sh})}{\partial p_{ex}},$$

and it may be calculated according to the following Equation 7.

$$\frac{\partial R_{(i,n)}}{\partial I_{d(i,n)}} = \quad \text{[Equation 7]}$$

$$-\frac{1}{\ln 2} \cdot \frac{|h_{ex(i,n)}^{D2D}|^2 p_{ex(i,n)}}{(\sigma^2 + I_{d(i,n)})^2 + (\sigma^2 + I_{d(i,n)})|h_{ex(i,n)}^{D2D}|^2 p_{ex(i,n)}} \equiv$$

$$-C_{ex(i,n)}$$

Herein, σ represents a noise power, i.e., interference between D2D groups using resources such as $I_d$.

The base station 100 may calculate the power allocated to the exclusive resource block by applying the KKT condition of Equation 4 and $$\sum_{\substack{i=1\\i\neq s}}^{N_s^*} C_{ex(i,n)}|h_{ex(i,n)}^{i2d}|^2 = \frac{\partial \sum_{\substack{z=1\\z\neq s}}^{N_s^*} R(p_{ex}, p_{sh})}{\partial p_{ex}}$$

to Equation 6.

As described above, using Equation 5 and Equation 6, the base station 100 calculates the powers to be allocated to the shared resource block and the exclusive resource block that are included in the virtual resource block, and accordingly controls power.

An algorithm proposed according to the exemplary embodiment of the present invention is shown in the following Table 1.

TABLE 1

Shared resource allocation
 $1 \leq m \leq M$
  find m* using [Equation 1]
D2D group formation & initial power setting
 $1 \leq s \leq N_s$ find $p_0$ using $y_s = \frac{1}{N\sigma^2} \sum_{n=1}^{N} |h_{ex(s,n)}^{d2d}|^2 p_{ex(s,n)}^{d2d}$ find s* using [Equation 2]
Optimal D2D power allocation through [Equation 5] and [Equation 6] with m*, s*, $p_0$
 $1 \leq s \leq N_s$
  find $[p_{sh}, p_{ex}]$ using an iterative water filling algorithm
  Apply $[p_{sh}, p_{ex}]$ to [Equation 5] and [Equation 6]
Find $[p_{ex}^*, p_{sh}^*]$ by substituting $[p_{sh}, p_{ex}]$ into [Equation 5] and [Equation 6]

Herein, m represents the number of cellular terminals, M represents a total number of cellular terminals, m* represent the resource block having the highest D2D performance, s represents the detected D2D group, $N_s$ represents a total number of D2Ds allocated to the group, $p_o$ represents an initial power, s* represents an optimal D2D group, $p_{sh}$ represents the power to be allocated to the shared resource block, $p_{ex}$ represents the power allocated to the exclusive resource block, $$\gamma_s = \frac{1}{N\sigma^2} \sum_{n=1}^{N} |h_{ex(s,n)}^{d2d}|^2 p_{ex(s,n)}^{d2d}$$

represents an average signal-to-noise ratio (SNR) of D2D users using the exclusive resource block.

Using the algorithm as described above, the base station 100 may improve spectral efficiency in each D2D communication as well as in the overall D2D communication by adjusting the powers allocated to the shared resource block and the exclusive resource block, while maintaining the total amount of power in the overall D2D communication system.

FIG. 4 is a drawing for illustrating spectral efficiency associated with D2D transmission powers according to the exemplary embodiment of the present invention.

FIG. 4 shows experimental results of performance of the D2D communication system according to the exemplary embodiment of the present invention and the resource and power allocation method using the same under a 3GPP LTE-Advanced environment according to parameters as shown in the following Table 2.

TABLE 2

| Parameter | Value | Parameter | Value |
| --- | --- | --- | --- |
| Cell radius (m) | 500 | D2D transmission distance | 50 |
| Total bandwidth | 10 | No. of Ex resources | 1 |
| No. of sub-channels | 48 | Thermal noise PSD (dBm/Hz) | −174 |
| No. of subcarriers (N) | 12 | Noise figure (dB) | 5 |
| Subcarrier bandwidth (kHz) | 15 | Pathloss exponent | 4 |
| Maximum Tx power | 23 | Cellular target SNR (dB) | 20 |

FIG. 5 shows spectral efficiency (bps/Hz/cell) of the D2D system under various conditions of the D2D transmission power (dBM).

In FIG. 5, dotted lines ((a), (c), (e)) represent performance of a D2D system using only the exclusive resource, and solid lines ((b), (d), (f)) represent performance of a D2D system using both the exclusive resource and the shared resource according to the exemplary embodiment of the present invention.

A dotted line with black circles (a) represents a case where the exclusive resource is not shared but is used by a single D2D terminal, a dotted line with black squares (c) represents a case where the exclusive resource is shared by a pair of D2D terminals, and a dotted line with black triangles (e) represents a case where the exclusive resource is shared by four D2D terminals.

That is, when only the exclusive resource is used, it can be seen that the spectral efficiency is improved by a frequency reuse gain when the number of D2D users ($N_s$) sharing the same resource increases.

In addition, a graph of a solid line with blue circles (b) shows spectral efficiency when a single D2D terminal uses the exclusive resource and the shared resource, a solid line with red squares (d) shows spectral efficiency when two D2D terminals sharing the exclusive resource use the shared resource together, and a solid line with blue triangles (f) shows spectral efficiency when four D2D terminals sharing the exclusive resource use the shared resource together.

As de, it can be seen that the D2D system proposed in the present invention shows considerably excellent performance in terms of spectral efficiency.

According to the exemplary embodiment of the present invention, in the D2D system using the cellular resources, the spectral efficiency of the D2D system can be improved through the resource allocation for sharing the resources of the cellular users along with the exclusive resource allocation for the D2D users.

In addition, in the present invention, the D2D transmission power is limited to guarantee the performance of the cellular user when the cellular resource is shared, and the spectrum efficiency and the performance of the entire cells can be improved by the plurality of D2D users forming the group to spatially reuse the same resource.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Accordingly, the actual technical protection scope of the present invention must be determined by the spirit of the appended claims.

What is claimed is:

1. A device-to-device (D2D) communication system D2D for sharing a cellular resource, wherein a base station included in the D2D communication system includes: a shared resource allocation unit configured to select a resource block having highest performance in D2D communication from a plurality of resource blocks occupied by a plurality of cellular terminals and to set the shared resource block to be shared by a corresponding D2D terminal; an exclusive resource allocation unit configured to select at least one other D2D terminal with which to share an exclusive resource block occupied by the corresponding D2D terminal for the D2D communication and to set the exclusive resource block to be shared by the at least one other D2D terminal; and a power allocation unit configured to create a virtual resource block by matching the shared resource block and the exclusive resource block and to control powers allocated to the shared resource block and the exclusive resource block included in the virtual resource block, wherein the shared resource allocation unit selects a resource block having highest D2D performance and sets the resource block as a shared resource block according to the following equation:

$$m^* = \underset{m}{\operatorname{argmax}} \log\left(1 + \frac{\sum_{n=1}^{N} |h_{sh(m,n)}^{d2d}|^2 \Delta_{(m)}^{d2d}}{\sum_{n=1}^{N} |h_{sh(m,n)}^{cd}|^2 p_{sh(m)}^{cue} + N\sigma^2}\right),$$

where $m^*$ represents the selected resource block, m represents the number of cellular, $h_{sh(m,n)}^{d2d}$ represents a channel corresponding to the shared resource block for the D2D communication, $\Delta_{(m)}^{d2d}$ represents a transmission power threshold of the D2D terminal, $h_{sh(m,n)}^{cd}$ represents a channel corresponding to the resource block between the cellular terminal and the base station, $p_{sh(m)}^{cue}$ represents a cellular communication power in the shared resource block, and N represents the number of subcarriers, and σ represents a noise power.

2. The D2D communication system of claim 1, wherein the exclusive allocation unit selects the D2D terminal with which to share the exclusive resource block according to the following equation:

$$s^* = \underset{s}{\operatorname{argmax}} \delta_s \log\left(1 + \frac{\sum_{n=1}^{N} |h_{ex(s,n)}^{d2d}|^2 p_{ex(s)}^{d2d}}{\sum_{\substack{i=1 \\ i \ne s}}^{N_s} |h_{ex(i,n)}^{i2d}|^2 p_{ex(i)}^{i2d} + N\sigma^2}\right),$$

where $s^*$ represents a selected D2D group, S represents a plurality of detected candidate D2D terminal groups, $h_{ex(s,n)}^{d2d}$ represents a channel corresponding to the exclusive resource block for the D2D communication, $p_{ex(s)}^{d2d}$ represents a D2D communication power in the exclusive resource block, $h_{ex(i,n)}^{i2d}$ represents a channel corresponding to the D2D terminal with which to share the exclusive resource block, $p_{ex(i)}^{i2d}$ represents a communication power corresponding to the D2D terminal with which to share the exclusive resource block, N represents the number of subcarriers, and σ represents a noise power.

3. The D2D communication system of claim 1, wherein a condition of $$\sum_{n=1}^{N} p_{ex(s,n)} + p_{sh(s,n)} \le P_{max}, \ p_{[ex,sh](s,n)} \ge 0 \text{ and } \sum_{n=1}^{N} p_{sh(s,n)} \le \Delta_s$$

is satisfied, the power allocation unit calculates a maximum power of the set D2D group for the shared resource block and the exclusive resource block included in the virtual resource block according to the following equation:

$$\operatorname{Maximize} \sum_{s=1}^{N_s^*} \sum_{n=1}^{N} \log_2\left(1 + \frac{|h_{ex(s,n)}^{d2d}|^2 p_{ex(s,n)}}{\sum_{\substack{i=1 \\ i \ne s}}^{N_s^*} |h_{ex(i,n)}^{i2d}|^2 p_{ex(i,n)} + \sigma^2}\right) +$$

$$\log_2\left(1 + \frac{|h_{sh(s,n)}^{d2d}|^2 p_{sh(s,n)}}{|h_{sh(s,n)}^{cd}|^2 p_{sh(s,n)}^{cue} + \sigma^2}\right),$$

where $\Delta_s$ represents the maximum transmission power of a plurality of detected D2D groups, $h_{ex(s,n)}^{d2d}$ represents a channel corresponding to the exclusive resource block of the D2D communication terminal, $p_{ex(s,n)}$ represents an initial power allocated to the exclusive resource block, $h_{ex(i,n)}^{i2d}$ represents a channel corresponding to an exclusive resource block of an i-th candidate D2D communication terminal, $p_{ex(i,n)}$ represents power allocated to the exclusive resource block of the i-th candidate D2D communication terminal, $h_{sh(s,n)}^{d2d}$ represents a channel corresponding to the shared resource block between the corresponding D2D communication terminals, $p_{sh(s,n)}$ represents an initial power allocated to the shared resource block, $h_{sh(s,n)}^{cd}$ represents a channel corresponding to the shared resource block between the cellular terminal and the corresponding D2D communication terminal, $p_{sh(s,n)}^{cue}$ represents a cellular power allocated to the shared resource block, and σ represents a noise power.

4. The D2D communication system of claim 3, wherein the power allocation unit calculates power to be allocated to the shared resource block included in the virtual resource block, and allocates the calculated power according to the following equation:

$$P_{sh(s,n)}^* = \left(\frac{1}{\ln 2} \frac{1}{\lambda_s + u_s} - \frac{|h_{sh(s,n)}^{cd}|^2 p_{sh(s,n)}^{cue} + \sigma^2}{|h_{sh(s,n)}^{d2d}|^2}\right)^+,$$

where $P^*_{sh(s,n)}$ represents power to be allocated to the shared resource block, $P^*_{ex(s,n)}$ represents power to be allocated to the exclusive resource block, $\lambda_s$ and $u_s$ represent lagrange multipliers, $h_{sh(s,n)}^{cd}$ represents a channel corresponding to the shared resource block between the cellular terminal and the corresponding D2D communication terminal, $p_{sh(s,n)}^{cue}$ represents a cellular power allocated to the shared resource block, $h_{sh(s,n)}^{d2d}$ represents a channel corresponding to the shared resource block of the corresponding D2D communication terminal, σ represents a noise power, and $(x)^+ = \min(0,x)$.

5. The D2D communication system of claim 3, wherein the power allocation unit calculates power to be allocated to the exclusive resource block included in the virtual resource block, and allocates the calculated power according to the following equation:

$$P_{ex(s,n)}^* = \left(\frac{1}{\ln 2} \frac{1}{\sum_{\substack{i=1 \\ i \ne s}}^{N_s^*} C_{ex(i,n)} |h_{ex(i,n)}^{2d}|^2 + \lambda_s} - \frac{\sum_{\substack{i=1 \\ i \ne s}}^{N_s^*} |h_{ex(i,n)}^{i2d}|^2 p_{ex(i)}^{i2d} + \sigma^2}{|h_{ex(s,n)}^{d2d}|^2}\right)^+,$$

where $P^*_{ex(s,n)}$ represents power allocated to the exclusive resource block, $C_{ex(i,n)}$ represents $$\frac{\partial R_{(i,n)}}{\partial I_{d(i,n)}},$$

$h_{ex(i,n)}^{i2d}$ represents a channel corresponding to an exclusive resource block of an i-th candidate D2D communication terminal, $p_{ex(i)}^{i2d}$ represents power of the i-th candidate D2D terminal in the exclusive resource block, $h_{ex(i,n)}^{d2d}$ represents a channel corresponding to the exclusive resource block of the corresponding D2D communication terminal, and $(x)^+ = \min(0,x)$.

6. A method of allocating resources and power by a base station included in a D2D communication system for sharing a cellular resource, comprising: selecting a resource block having highest performance in D2D communication from a plurality of resource blocks and setting the resource block as a shared resource block to be shared by a corresponding D2D terminal; selecting at least one other D2D terminal with which to share an exclusive resource block occupied by the corresponding D2D terminal for the D2D communication and setting the exclusive resource block to be shared by the at least one other D2D terminal; and creating a virtual resource block by matching the shared resource block and the exclusive resource block and then controlling powers allocated to the exclusive resource block included in the virtual resource block, wherein
the setting of the resource block as the shared resource block to be shared by the corresponding D2D terminal sets the resource block having highest D2D performance as the shared resource block according to the following equation:

$$m^* = \underset{m}{\mathrm{argmax}} \log\left(1 + \frac{\sum_{n=1}^{N} |h_{sh(m,n)}^{d2d}|^2 \Delta_{(m)}^{d2d}}{\sum_{n=1}^{N} |h_{sh(m,n)}^{cd}|^2 p_{sh(m)}^{cue} + N\sigma^2}\right),$$

where $m^*$ represents the selected resource block, m represents the number of cellular terminals, $h_{sh(m,n)}^{d2d}$ represents a channel corresponding to the shared resource block for the D2D communication, $\Delta_{(m)}^{d2d}$ represents a transmission power threshold of the D2D terminal, $h_{sh(m,n)}^{cd}$ represents a channel corresponding to the resource block between the cellular terminal and the base station, $p_{sh(m)}^{cue}$ represents a cellular communication power in the shared resource block, N represents the number of subcarriers, and $\sigma$ represents a noise power.

7. The method of claim 6, wherein the setting of the exclusive resource block to be shared by the at least one other D2D terminal and the corresponding D2D terminal selects the D2D terminal with which to share the exclusive resource block according to the following equation:

$$s^* = \underset{s}{\mathrm{argmax}} \, \delta_s \log\left(1 + \frac{\sum_{n=1}^{N} |h_{ex(s,n)}^{d2d}|^2 p_{ex(s)}^{d2d}}{\sum_{\substack{i=1 \\ i \neq s}}^{N_s} |h_{ex(i,n)}^{i2d}|^2 p_{ex(i)}^{i2d} + N\sigma^2}\right),$$

where $s^*$ represents a selected D2D group, S represents a plurality of detected candidate D2D terminal groups, $h_{ex(s,n)}^{d2d}$ represents a channel corresponding to the exclusive resource block for the D2D communication, $p_{ex(s)}^{d2d}$ represents a D2D communication power in the exclusive resource block, $h_{ex(i,n)}^{i2d}$ represents a channel corresponding to the D2D terminal with which to share the exclusive resource block, $p_{ex(i)}^{i2d}$ represents a communication power corresponding to the D2D terminal with which to share the exclusive resource block, N represents the number of subcarriers, and $\sigma$ represents a noise power.

8. The method of claim 6, wherein, when a condition of $$\sum_{n=1}^{N} p_{ex(s,n)} + p_{sh(s,n)} \leq P_{max}, \; p_{[ex,sh](s,n)} \geq 0 \text{ and } \sum_{n=1}^{N} p_{sh(s,n)} \leq \Delta_s$$

is satisfied, the controlling of the powers allocated to the shared resource block and the exclusive resource block calculates power of the set D2D group for the shared resource block and the exclusive resource block included in the virtual resource block according to the following equation:

$$\text{Maximize} \sum_{s=1}^{N_s^*} \sum_{n=1}^{N} \log_2\left(1 + \frac{|h_{ex(s,n)}^{d2d}|^2 p_{ex(s,n)}}{\sum_{\substack{i=1 \\ i \neq s}}^{N_s^*} |h_{ex(i,n)}^{i2d}|^2 p_{ex(i,n)} + \sigma^2}\right) +$$

$$\log_2\left(1 + \frac{|h_{sh(s,n)}^{d2d}|^2 p_{sh(s,n)}}{|h_{sh(s,n)}^{cd}|^2 p_{sh(s,n)}^{cue} + \sigma^2}\right),$$

where $\Delta_s$ represents a maximum transmission power of a plurality of detected D2D groups, $h_{ex(s,n)}^{d2d}$ represents a channel corresponding to the exclusive resource block of the D2D communication terminal, $p_{ex(s,n)}$ represents an initial power allocated to the exclusive resource block, $h_{ex(i,n)}^{i2d}$ represents a channel corresponding to an exclusive resource block of an i-th candidate D2D communication terminal, $p_{ex(i,n)}$ represents power allocated to an exclusive resource block of the i-th candidate D2D communication terminal, $h_{sh(s,n)}^{d2d}$ represents a channel corresponding to the shared resource block between the corresponding D2D communication terminals, $p_{sh(s,n)}$ represents an initial power allocated to the shared resource block, $h_{sh(s,n)}^{cd}$ represents a channel corresponding to the shared resource block between the cellular terminal and the corresponding D2D communication terminal, $p_{sh(s,n)}^{cue}$ represents a cellular power allocated to the shared resource block, and $\sigma$ represents a noise power.

9. The method of claim 8, wherein the controlling of the power allocated to the shared resource block calculates the power to be allocated to the shared resource block included in the virtual resource block, and allocates the calculated power according to the following equation:

$$P_{sh(s,n)}^* = \left(\frac{1}{\ln 2} \frac{1}{\lambda_s + u_s} - \frac{|h_{sh(s,n)}^{cd}|^2 p_{sh(s,n)}^{cue} + \sigma^2}{|h_{sh(s,n)}^{d2d}|^2}\right)^+,$$

where $P^*_{sh(s,n)}$ represents power to be allocated to the shared resource block, $P^*_{ex(s,n)}$ represents power to be allocated to the exclusive resource block, $\lambda_s$ and $u_s$ represent lagrange multipliers, $h_{sh(s,n)}^{cd}$ represents a channel corresponding to the shared resource block between the cellular terminal and the corresponding D2D communication terminal, $p_{sh(s,n)}^{cue}$ represents a cellular power allocated to the shared resource block, $h_{sh(s,n)}^{d2d}$ represents a channel corresponding to the shared resource block of the corresponding D2D communication terminal, $\sigma$ represents a noise power, and $(x)^+ = \min(0,x)$.

10. The method of claim 8, wherein the controlling of the power allocated to the exclusive resource block calculates power to be allocated to the exclusive resource block included in the virtual resource block, and allocates the calculated power according to the following equation:

$$P^*_{ex(s,n)} = \left( \frac{1}{\ln 2} \frac{1}{\sum_{\substack{i=1 \\ i \neq s}}^{N_s^*} C_{ex(i,n)} |h^{i2d}_{ex(i,n)}|^2 + \lambda_s} - \frac{\sum_{\substack{i=1 \\ i \neq s}}^{N_s^*} |h^{i2d}_{ex(i,n)}|^2 p^{i2d}_{ex(i)} + \sigma^2}{|h^{d2d}_{ex(s,n)}|^2} \right)^+,$$

where $p^*_{ex(s,n)}$ represents power allocated to the exclusive resource block, $C_{ex(i,n)}$ represents $$\frac{\partial R_{(i,n)}}{\partial I_{d(i,n)}},$$

$h_{ex(i,n)}^{i2d}$ represents a channel corresponding to an exclusive resource block of an i-th candidate D2D communication terminal, $p_{ex(i)}^{i2d}$ represents power of the i-th candidate D2D terminal in the exclusive resource block, $h_{ex(s,n)}^{d2d}$ represents a channel corresponding to the exclusive resource block of the corresponding D2D communication terminal, and $(x)^+ = \min(0, x)$.

* * * * *